April 20, 1937.  W. A. SMITH  2,077,858
AUTOMATIC BATTERY FOR LOOMS
Filed Sept. 5, 1935  9 Sheets-Sheet 5

Inventor:
WILLIAM A. SMITH
By Pane N Eaton
Attorney

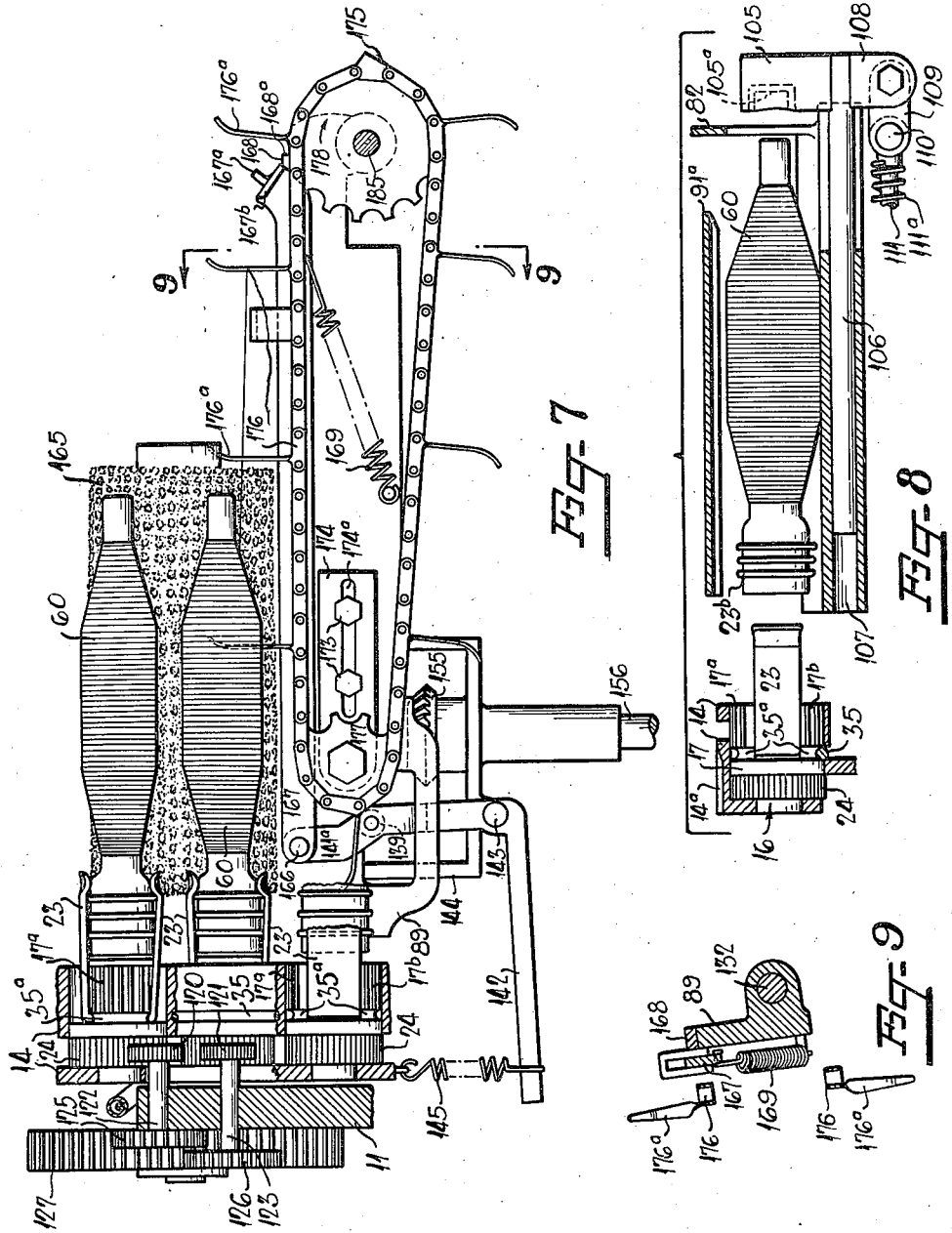

April 20, 1937.　　　　　W. A. SMITH　　　　　2,077,858
AUTOMATIC BATTERY FOR LOOMS
Filed Sept. 5, 1935　　　9 Sheets-Sheet 7
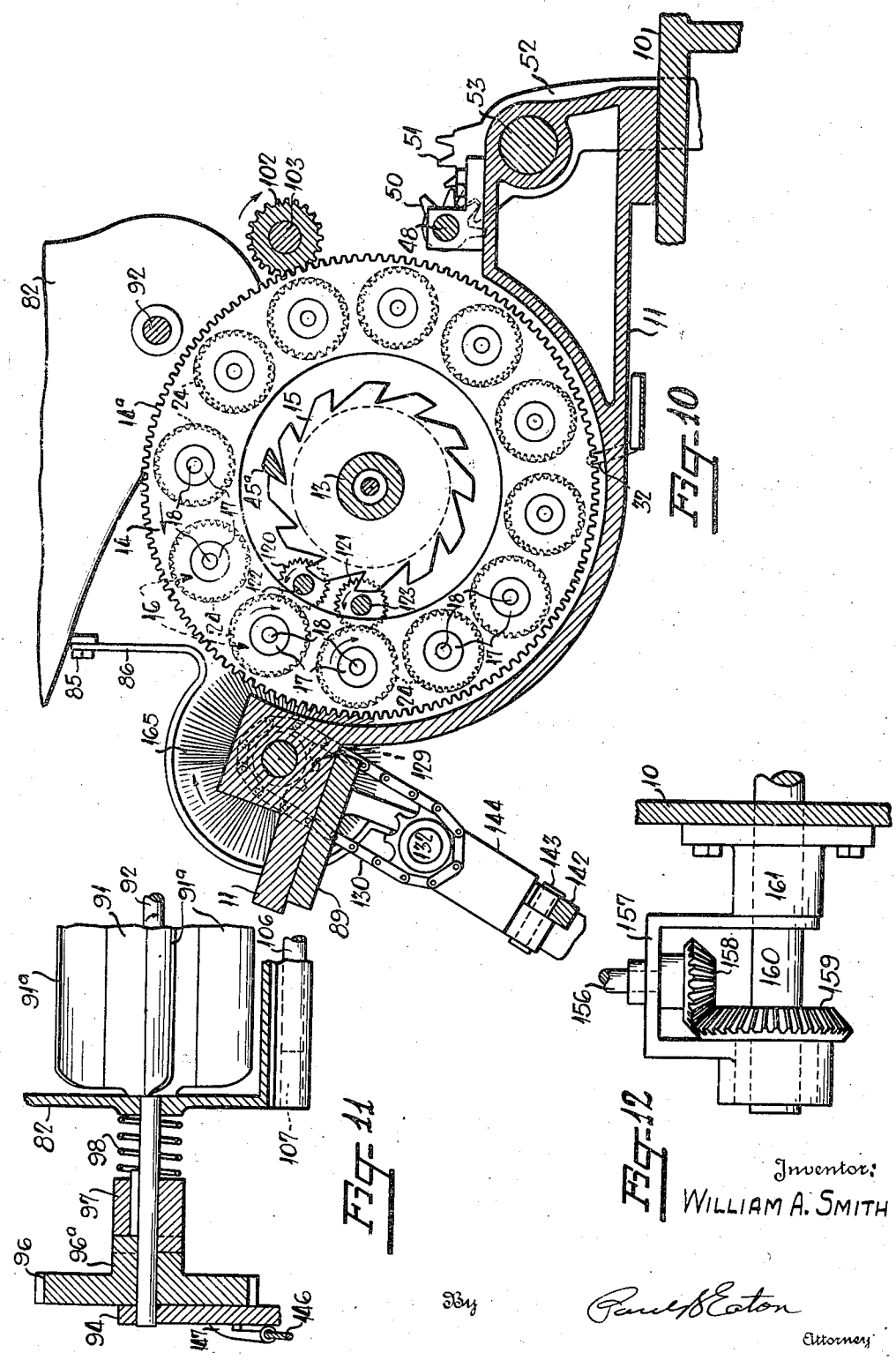
Inventor:
WILLIAM A. SMITH
By
Paul S Eaton
Attorney

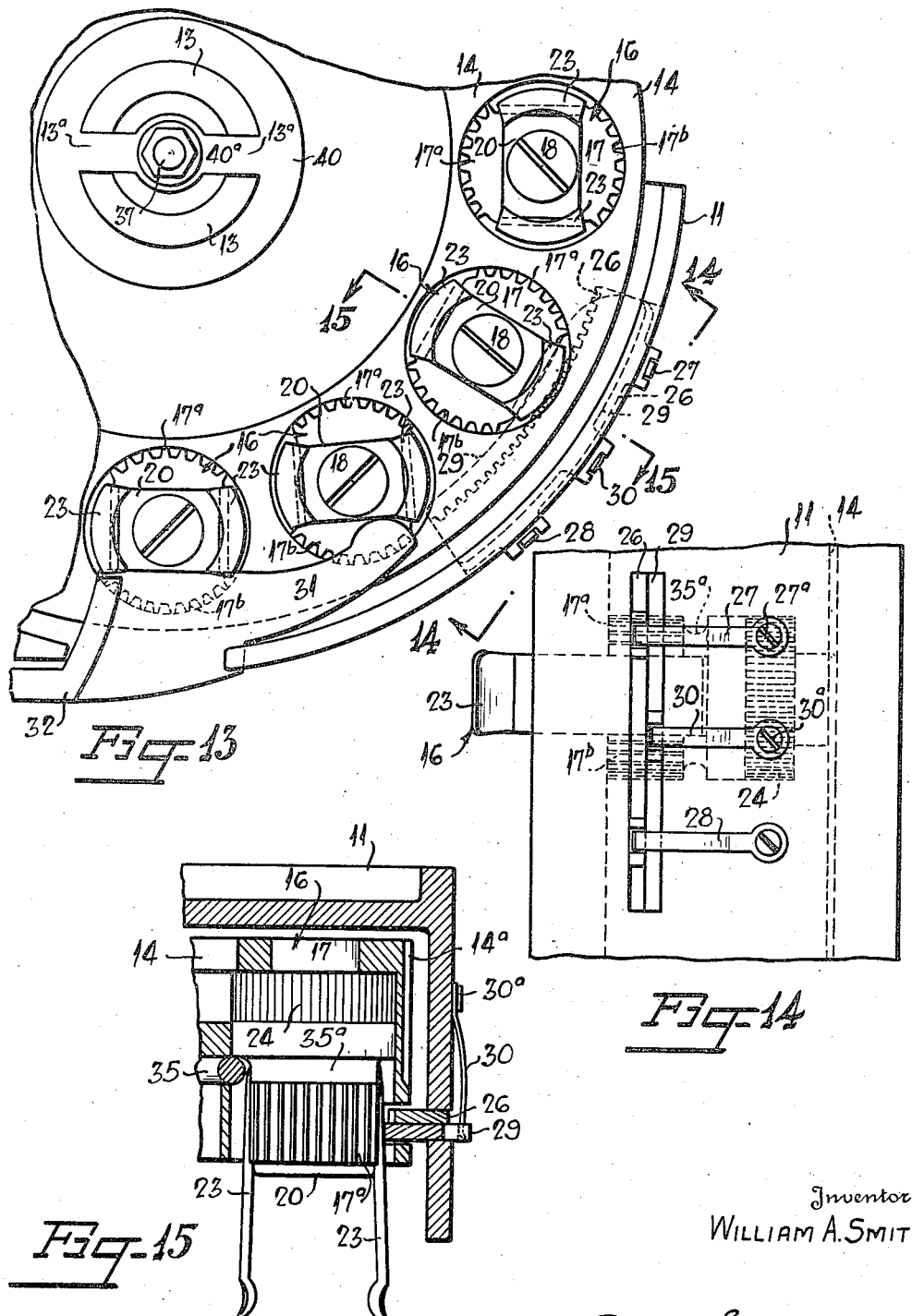

April 20, 1937.  W. A. SMITH  2,077,858
AUTOMATIC BATTERY FOR LOOMS
Filed Sept. 5, 1935  9 Sheets-Sheet 9
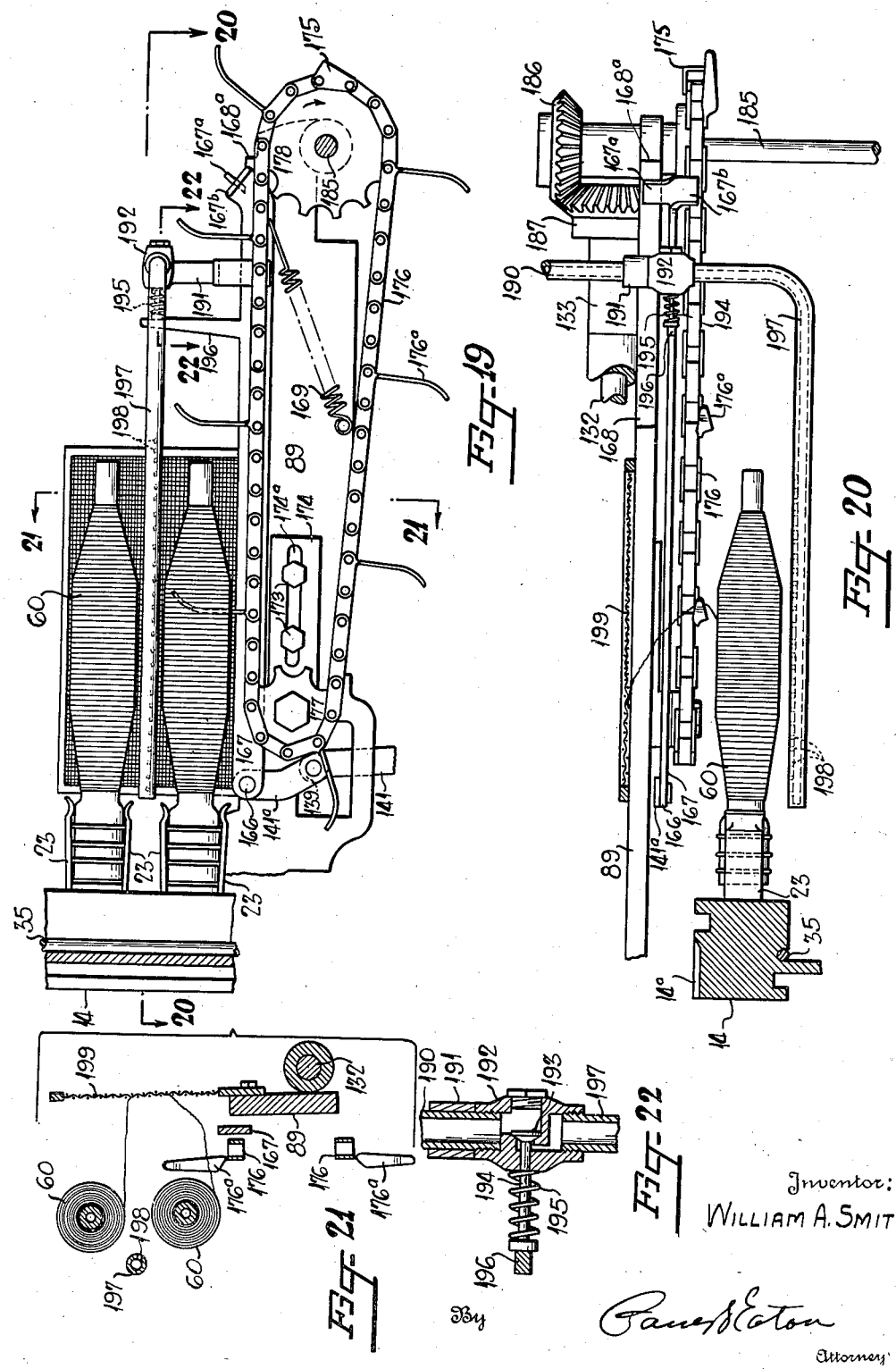
Inventor:
WILLIAM A. SMITH
By
Paul S Eaton
Attorney Patented Apr. 20, 1937

2,077,858

UNITED STATES PATENT OFFICE 2,077,858

AUTOMATIC BATTERY FOR LOOMS

William A. Smith, Greenville, S. C.

Application September 5, 1935, Serial No. 39,323

10 Claims. (Cl. 139—245)

The present invention relates to a filling replenishing mechanism for looms of the type employing a rotary hopper for carrying a reserve supply of filling carriers which are automatically transferred, one at a time, as needed, into the shuttle, and more especially to a mechanism of the type described having means for automatically feeding a bobbin from a stationary hopper to a rotary hopper as a bobbin is transferred from the rotary hopper into the shuttle.

It is an object of this invention to provide in a weft replenishing mechanism for looms having a rotary hopper, a second or stationary hopper disposed directly above the rotary hopper for containing a plurality of bobbins with means disposed in said second stationary hopper for automatically replenishing the first or rotary hopper as the bobbins are exhausted by the loom.

It is a further object of this invention to provide in a rotary hopper means for automatically placing the filling carriers in said hopper, means for automatically gathering the loose ends on said filling carriers and winding the same around a suitable spindle so that when the filling carrier is transferred into the shuttle the end will be held as the shuttle is picked from one end of the lay of the loom to the other.

In order to accomplish this result it is necessary to provide a specially constructed rotary hopper for carrying a plurality of filling carriers and means for supporting these filling carriers at one point only, namely, at the butt of the bobbin. By supporting the filling carriers in this manner, it is possible to provide means for engaging the loose ends on the filling carrier and winding the same onto a suitable spindle. In a conventional hopper, where a disk is used, it is evident that this structure could not be used so advantageously since the disk would interfere with gathering the loose end for automatically winding it around a spindle.

It is a further object of this invention to provide in a weft replenishing mechanism having a rotary hopper, pneumatic means disposed in close proximity to the filling carriers for directing a blast of air thereon to remove the loose ends so that a suitable mechanical means can engage the same and wind them around a shaft or spindle.

Some of the objects of the invention having been stated, other objects will appear as the description proceeds when taken in connection with the accompanying drawings, in which:—

Figure 7 is a vertical sectional view taken along line 7—7 in Figure 1;

Figure 8 is a vertical sectional view taken along line 8—8 in Figure 1;

Figure 9 is a sectional view taken along line 9—9 in Figure 7;

Figure 10 is a vertical sectional view taken along line 10—10 in Figure 2;

Figure 11 is a sectional view taken along line 11—11 in Figure 4;

Figure 12 is a view taken along line 12—12 in Figure 1;

Figure 13 is an enlarged detail view of the central portion of Figure 1 showing the rotary hopper with the filling carriers removed therefrom;

Figure 14 is a view taken along line 14—14 in Figure 13;

Figure 15 is a sectional view taken along line 15—15 in Figure 13;

Figure 16 is a view similar to the lower portion of Figure 3 but showing the parts in a different position;

Figure 17 is a vertical sectional view taken along line 17—17 in Figure 3;

Figure 18 is a vertical sectional view taken along line 18—18 in Figure 4 showing the details of the filling carrier support;

Figure 19 is a sectional view similar to Figure 7 but showing pneumatic means for finding the loose ends on the filling carriers;

Figure 20 is a sectional plan view taken along line 20—20 in Figure 19;

Figure 21 is a vertical sectional view taken along line 21—21 in Figure 19;

Figure 22 is a sectional detail view taken along line 22—22 in Figure 19.

Figure 1:
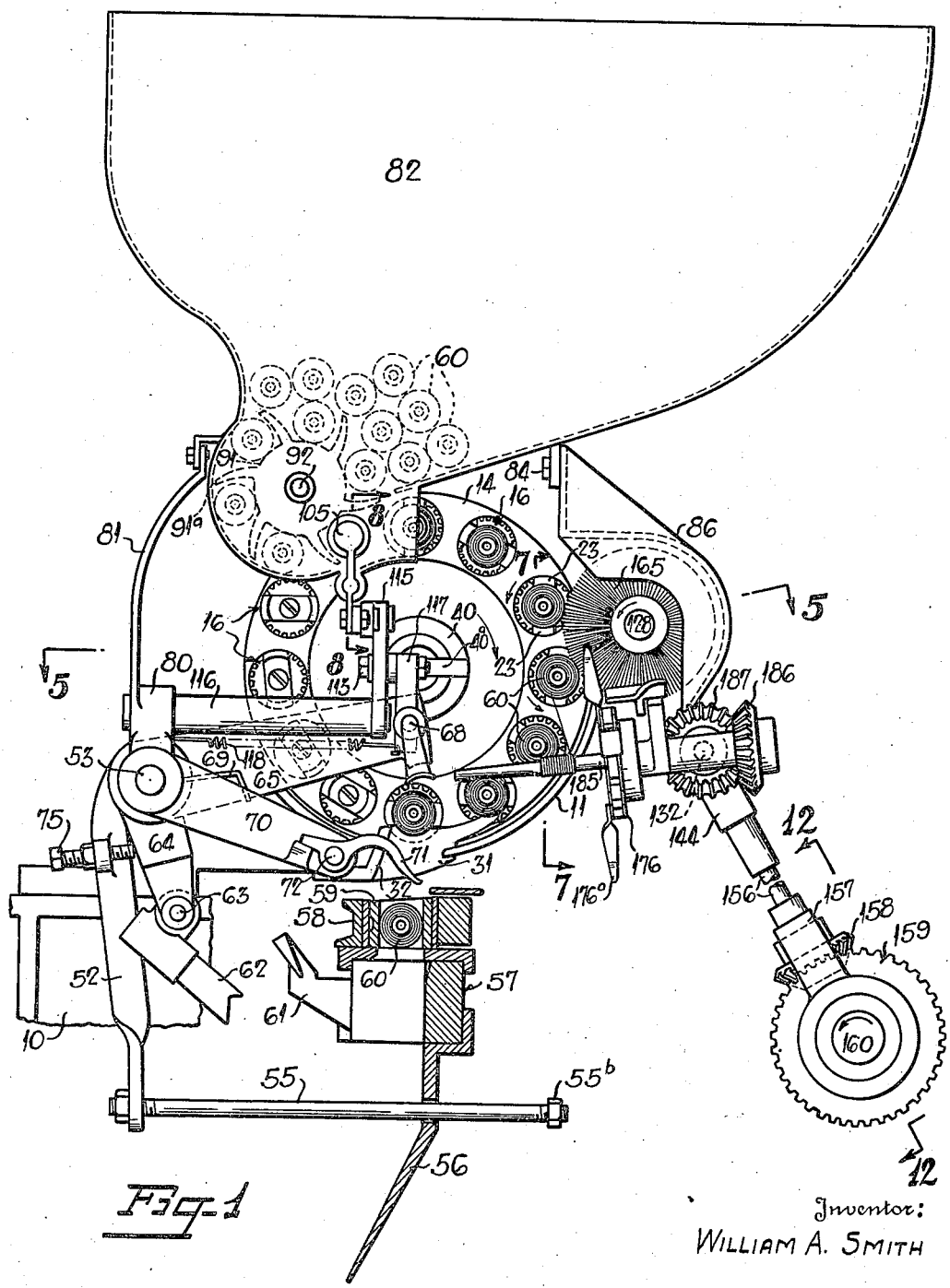
Figure 1 is an elevation of the invention applied to a loom showing portions of the lay in section.

Referring more particularly to the drawings, the numeral 10 denotes a loom frame upon which is mounted a hopper stand 11 by any suitable means such as stud bolts 12. This hopper stand has a stud 13 fixedly secured therein (Fig. 5) and around which is rotatably mounted a disk or rotary hopper 14. Secured to rotary hopper 14 is ratchet wheel 15 (Fig. 10) which is also rotatably mounted on stud shaft 13. The rotary hopper 14 has a plurality of filling carrier supports 16 (Fig. 18) which comprises a hub portion 17 having threadably secured therein screw 18 and around screw 18 is a compression spring 19 confined between plates 20 and 21. The plate 21 is loosely mounted on pin 18 and has two projections 21a integral therewith which are adapted to loosely penetrate holes in clamping member 23.

It should be noted that the clamping members 23 are L-shaped and the long leg thereof has corrugations 23a therein which are adapted to fit over the rings 23b on the butt of a quill or bobbin. In the position shown in Figure 18, it is evident that the right-hand ends of clamping members 23 are normally pressed against the ends of U-shaped plate 20, since the compression spring 19 forces plate 21 against the short legs of members 23 and against the hub portion 17.

When the butt of a quill or bobbin is forced between the flared ends of members 23, it is necessary for these members to spread a slight amount in order to allow the butt end of the quill or bobbin to enter. When this spreading takes place, the short leg of members 23 will force the plate 21 to the right (Fig. 18), against the compression of spring 19; therefore, providing means for causing the flared ends of members 23 to tightly engage the base of the quill or bobbin after it has once been placed therein.

Each end of filling carrier supports 16 has a gear 24 integral therewith, said gear having knife-edge teeth thereon which are adapted to engage a suitable mechanism, to be later described, for rotating the filling carrier support to cause the yarn to be unwound when it reaches a certain position on the rotary hopper.

By referring to Figures 13, 14 and 15, it is seen that each of the filling carrier supports 16 has the hub portion 17 thereof provided with a transverse notch in the front end of same, and in this notch the clamping members 23 and their associated parts are mounted. The hub member 17, at the point where it is notched, has the appearance of two segments of a circle in which gear teeth or segments 17a and 17b are cut. These gear segments, when the hopper 14 is rotated, are adapted to engage the rack member 26 and rotate the filling carrier supports 16 to the position shown by the second carrier from the top in Figure 13.

In Figure 13 the segments 17a and 17b are not shown engaged with the rack member 26, because when a filling carrier support 16 reaches this rack, the rack immediately turns the filling carrier support 16 to a position occupied by the second carrier from the top on Figure 13. The rack member 26 is slidably mounted in a slot in the hopper stand 11 and is held in that position by any suitable means such as springs 27 and 28 fixedly secured to hopper stand 11 as at 27a and 28a respectively.

When the uppermost filling carrier support 16, as shown in Figure 13, reaches this rack and is turned to the position shown by the second carrier from the top, a plate 29 engages the flat side of one of the clamping members 23 and causes the member to remain in the same relative position with respect to the hopper 14 as it is rotated towards the transfer point. This plate 29 is slidably mounted in a slot in hopper stand 11 and is placed adjacent plate 26 which has just been described. This plate 29 is resiliently held in contact with the back of clamping member 23 by any suitable means such as a leaf-spring 30 secured as at 30a to the hopper stand 11.

Figure 4:
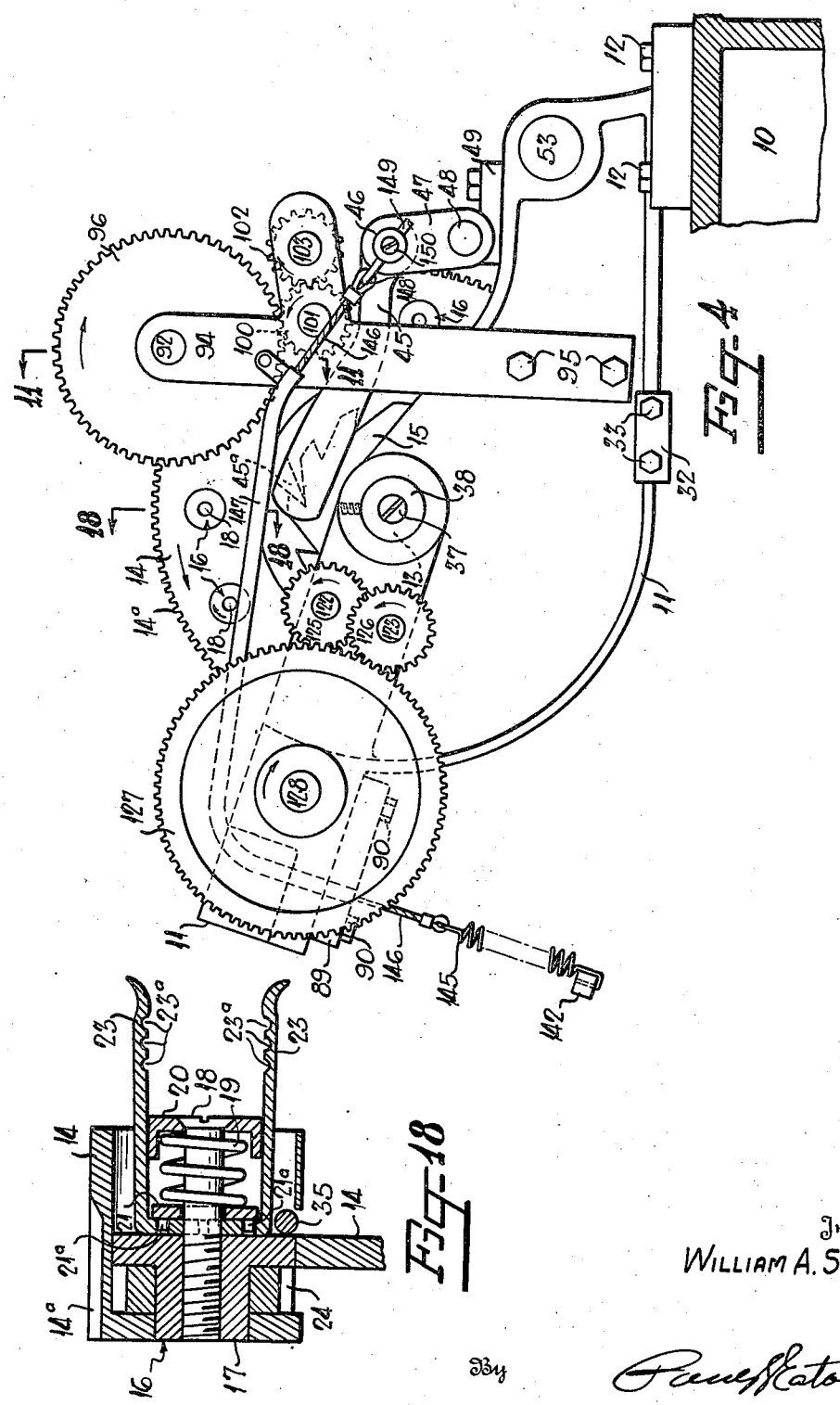
Figure 4 is a rear elevation taken along line 4—4 in Figure 2, and showing portions of the loom frame in section.

It is necessary for the filling carrier supports 16 when they reach the position shown by the second one from the top in Figure 13, to have the flat sides of the clamping members 23 disposed parallel to the radius of hopper 14 so that as the rotary hopper 14 is rotated in a clockwise manner the end of cam 31 will engage the side of U-shaped plate 20 and turn the filling carrier support 16 to the position shown in the lowermost position in Figure 13 ready for a transfer operation. The cam member 31 is welded to curved guide or angle member 32 and is adapted to press against the front face of rotary hopper 14. The curved guide 32 is secured to the lower portion of bracket 11 by any suitable means such as stud bolts 33 (Fig. 4).

Figure 5:
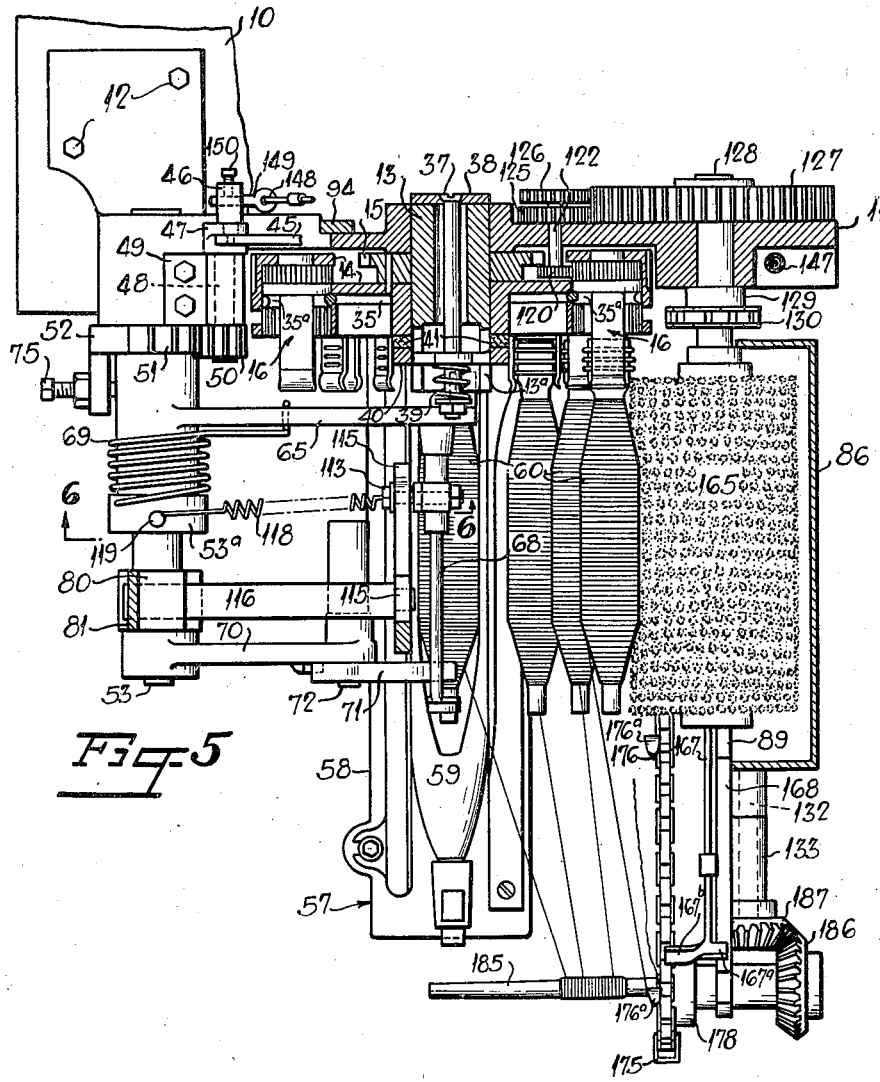
Figure 5 is a sectional plan view taken along line 5—5 in Figure 1.

In order to hold the filling carrier supports 16 in their respective cavities in hopper 14, a resilient wire hoop member 35 is provided which is adapted to fit in groove 35a around each of the filling carrier supports 16, (Figs. 5, 15 and 18). By exerting pressure on the back side of the filling carrier supports 16, it is possible to remove the filling carrier supports 16 from their cavities but under normal operation the hoop 35 prevents the filling carrier supports from coming out during operation of the machine, and are allowed to remain therein for rotation.

The stud 13 is hollow (Figs. 5 and 13), and has a bolt 37 penetrating said hole. A washer 38 is provided on the back end of bolt 37. On the other end of bolt 37 is a compression spring 39 which is pressed against washer 40. Washer 40 has a transverse portion 40a which is adapted to fit in slots 13a cut in stud 13. This prevents the washer from rotating when the hopper is rotated. Disposed between the hub of rotary hopper 14 and the washer 40 is a fibrous washer 41, which acts as a brake for the rotary hopper when it is rotated to a new position.

It is a well known fact that when a transfer takes place it is necessary to move the hopper to a new position very quickly and were it not for the fibrous washer 41 there would be a tendency for the rotary hopper to rebound after it had moved to a new position.

The rotary hopper 14 and its associated parts are advanced step by step by means of a suitable lateral pointed portion 45a on lever 45 (Figs. 4, 5 and 10) which engages the teeth in ratchet wheel 15. The other end of dog 45 is pivoted by bolt 46 to lever 47, said lever 47 being fixedly secured on shaft 48. This shaft is rotatably mounted in bracket 49, which in turn, is secured to the top surface of hopper stand 11. Fixedly secured on the other end of shaft 48 is a gear 50 (Figs. 2, 5 and 10), said gear 50 meshing with gear 51 which is cut in the upper end of lever 52. The lever 52 is rotatably mounted on shaft 53 which shaft is fixedly secured in hopper stand 11 and extends a substantial distance outwardly from this hopper stand to support the transfer mechanism.

An elongated bolt 55 (Figs. 1 and 2), penetrates the lower end of lever 52 and also penetrates a suitable hole in apron 56, said apron 56 being secured to lay 57 of the loom. Lay 57 has a conventional shuttle box 58 with a shuttle 59 and a package of yarn 60 therein. It is also equipped with bunter 61 which engages dog 62 after the filling has been exhausted from a filling carrier. When the filling is exhausted from a filling carrier the conventional filling feeler finger on the loom will actuate a suitable mechanism, which, in turn, will actuate a dog 62 and cause this dog to rotate in a counter-clockwise manner, (Fig. 1) about pivot point 63, so that the bunter 61 will engage this dog and rotate an arm 64 about shaft 53. When this is done, it is evident that the transfer arm 65 will move downwardly since it is integral with arm 64 and the end of arm 65 will engage the butt end of a filling carrier disposed in transfer position in the rotary hopper to cause the same to be transferred from the hopper 14 to the shuttle 59. The transfer arm 65 has secured thereto a laterally and downwardly extending arm 68 which engages the tip of the bobbin simultaneously with engagement of the arm 65 with the butt of the bobbin. The transfer arm 65 is normally urged in a counter-clockwise manner in Figure 1 by means of a suitable coil spring 69.

Shaft 53 has fixedly secured on the end thereof an arm 70, the end of said arm having a tip-supporting member 71 pivotally mounted as at 72 for yieldingly supporting the tip of a filling carrier 60 as it is transferred to the shuttle. This member is conventional and a further description is not deemed necessary.

During the normal operation of the loom, that is, when a transfer is not being made, but the shuttle 59 is being thrown back and forth across the loom, the parts 52, 55 and 62 remain in the position shown in Figure 1. The lay will oscillate back and forth and the apron 56 will slide on rod 55. When the lay 57 reaches its extreme right-hand position, with the parts in the position shown in Figure 1, the apron 56 will not touch the nut 55b on the end of rod 55. Instead, there will be a slight clearance when the lay has oscillated to its extreme right-hand position; therefore, the lever 52 and its associated parts will not be operated. When the filling has become exhausted from one of the quills or bobbins and the filling detector causes the dog 62 to rotate to a position where the bunter 61 will strike the same, the lever 64 will be oscillated in a clockwise manner to cause a transfer to take place which has previously been described. Upon this rotation, the lever 64 will contact the end of set screw 75 which is threadably mounted in a lug on the lever 52. Therefore, when any clockwise rotation is imparted to the lever 64 to cause a transfer to be made, the lever 52 is likewise caused to rotate in a like manner.

When lever 52 rotates, the lower end thereof will cause the bolt 55 to move to the left thereby placing the nut 55b which is on the end of bolt 55, in the path of the apron 56 when it oscillates to the extreme right-hand position again from the position shown in Figure 1. On the movement to the left, of the lay, in Figure 1, after the dog 62 has been caused to move by the filling feeler detector to where it will be engaged by the bunter 61, a new package of yarn is transferred from the hopper 14 to the shuttle 59 and the lever 52 is rotated in a clockwise manner in Figure 1 or in a counter-clockwise manner in Figure 10, thereby causing the gear 51 to rotate the gear 50 and the shaft 48 in a clockwise manner in Figure 10. This will cause lever 47 (Fig. 4), to likewise rotate in a clockwise manner which will drag the lever 45 over to the next notch in ratchet wheel 15.

When the lay 57 moves again to its extreme right-hand position, the apron 56 will engage the nut 55b to restore the lever 52 to its original position at which time lever 52 will be rotated in a clockwise manner in Figure 10, which, in turn, will cause the lever 48 to move the lever 45 in a counter-clockwise manner to advance the hopper 14 one notch. It should be noted that the ratchet wheel 15 has the same number of notches as the rotary hopper 14 has bobbin supports 16, so that when the ratchet wheel 15 is advanced one notch a package of yarn 60 is moved to a new position ready for transfer when the filling is exhausted on the bobbin in the shuttle.

The shaft 53 has secured thereon a bearing 80 which has integral therewith an upwardly extending support 81 which supports one side of a stationary hopper 82. This stationary hopper is also supported as at 84 and 85 (Fig. 3), by means of a shield 86 which surrounds a suitable brush 165 and extends downwardly and is secured as at 88 to elongated bracket 89. Bracket 89 is secured to the hopper stand 11 by any suitable means such as stud bolt 90.

The stationary hopper 82 is so constructed that a plurality of filling carriers 60 may be placed therein, to be selected one at a time by a grooved wheel 91 and conveyed to a position where the filling carrier will be placed in the rotary hopper. The hopper may be of sufficient size to hold enough filling carriers to supply the loom for an entire day.

Rotatably mounted in the lower portion of hopper 82 is wheel 91 having flutes 91a thereon which are adapted to engage a filling carrier and rotate it to a position where it will be placed in the rotary hopper. This wheel 91 is fixedly mounted on a shaft 92, said shaft being rotatably mounted in the sidewalls of stationary hopper 82. One end of shaft 92 extends a substantial distance out beyond the hopper 82 and has its ends rotatably mounted in the upper end of bracket 94, (Figs. 2 and 4), which bracket is secured to the hopper stand 11 by any suitable means such as stud bolts 95. Loosely mounted on shaft 92 is a gear 96 having a hub 96a integral therewith, said hub having a clutch face adapted to engage a clutch face on collar 97 (Figs. 2 and 11), which is keyed on shaft 92. Collar 97 is adapted to have sliding movement on said shaft and also has notches therein and is normally pressed into engagement with the hub member 96a by any suitable means such as a compression spring 98 disposed between collar 97 and hopper 82. If, by any chance, a filling carrier 60 should become entangled or engaged between one of the flutes 91a and the hopper 92 the members 96a, 97 and 98 will provide a safety means which will allow the gear wheel 96 to turn but will allow the shaft 92 and the wheel 91 to remain stationary. Were it not for this safety device, if a filling carrier became entangled between the flutes 91a and the hopper 82 serious damage might result to the machine.

The gear 96 meshes with a smaller gear 100 which is pivotally mounted as at 101 in bracket 94 (Fig. 4). This gear 100 meshes with another gear 102 which is mounted as at 103 in bracket 94. This gear 102 also meshes with gear teeth 14a (Figs. 2 and 10) in hopper 14; therefore, when the rotary hopper 14 is advanced by means of ratchet wheel 15 the gear 102 is rotated in a clockwise manner, (Fig. 10) and gear 100 is rotated in a counter-clockwise manner, which, in turn, will rotate the gear 96 and shaft 92 in a clockwise manner in Figure 4, to advance wheel 91, thereby positioning another package 60 so that it can be transferred into the rotary hopper 14.

Figure 2:
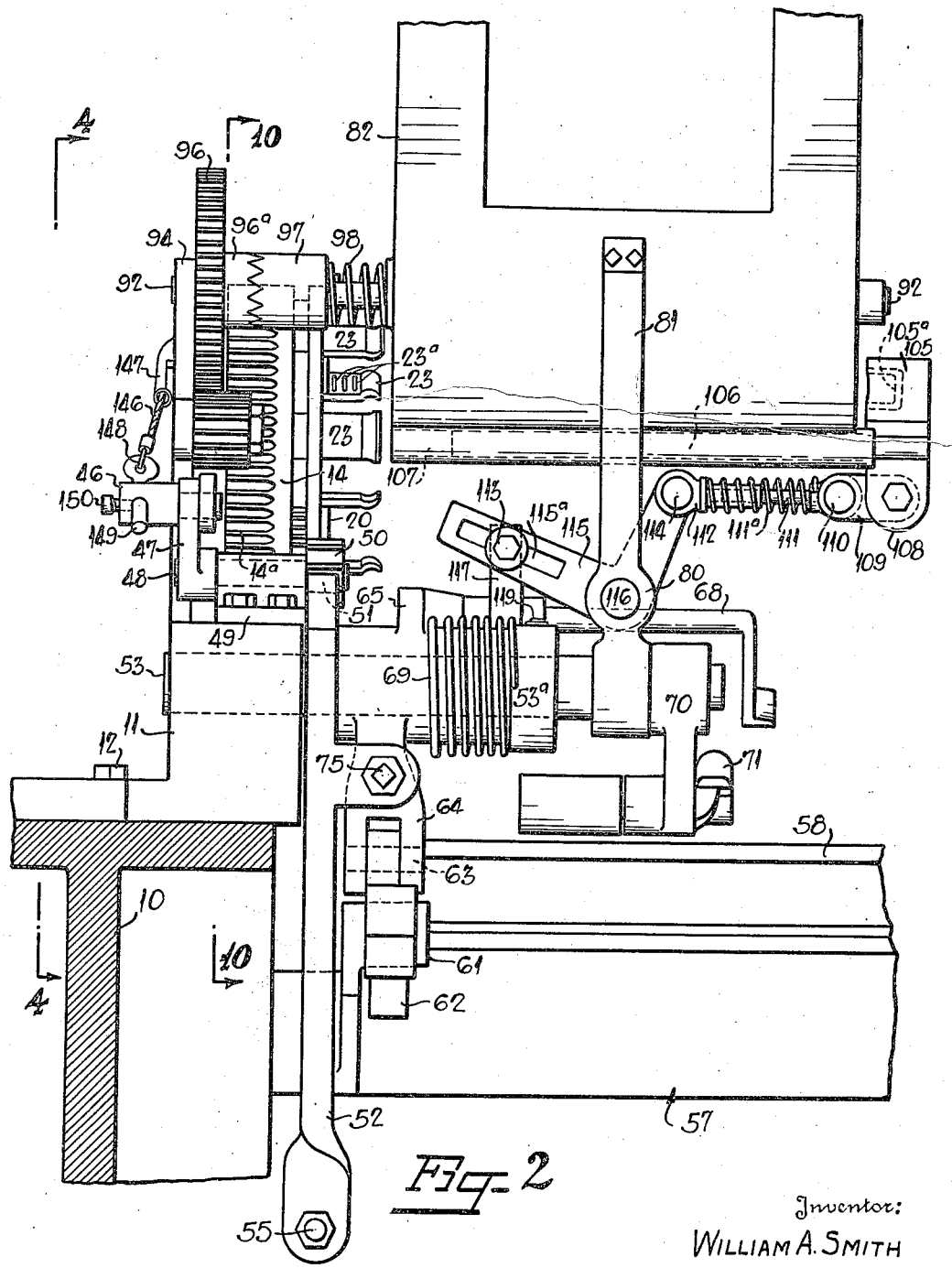
Figure 2 is an elevation looking at the left-hand side of Figure 1 and showing portions of the loom frame in section.

The means for transferring the package 60 from the stationary hopper 82 to the rotary hopper 14 is clearly shown in Figures 2 and 8. When the filling carrier has reached the position shown in Figures 2 and 8, along line 8—8, the tip end thereof is adapted to be engaged by an enlarged member 105 having a cavity 105a in which a suitable leather or fibrous material is placed for engaging the tip end of the filling carrier in order that it will not be damaged. The member 105 is integral with rod 106 disposed in the lower portion of stationary hopper 82.

In order to cause the filling carrier to be transferred from the stationary hopper 82 to the rotary hopper 14, and between the clamping members 23, the member 105 must be moved to the left in Figure 8 to engage the tip of the filling carrier, thereby pushing it to the left and causing the butt end thereof to be pressed between the clamping members 23.

Rod 106 has downwardly extending portion 108 to which is secured a laterally disposed link 109. This link has pivoted to the end thereof as at 110, a pin 111 which has its end slidably mounted in a suitable bore in member 112. A spring 111a surrounds the central portion of pin 111 and member 112 and has the ends thereof secured to said pin and member. The member 112 is pivoted as at 114 to one end of a suitable bell crank 115, said bell crank 115 being mounted for oscillation on one end of rod 116, which rod is fixed in bearing 80. The other end of bell crank 115 has a slot 115a therein which is penetrated by a bolt 113.

Figure 6:
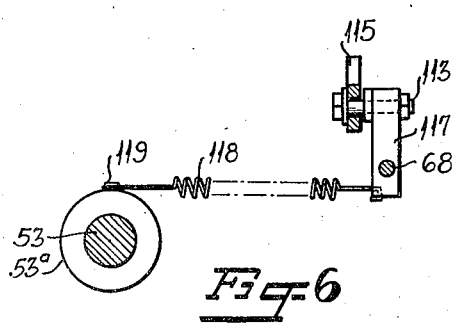
Figure 6 is a vertical sectional view taken along line 6—6 in Figure 5.

Bolt 113 also penetrates the upper end of lever 117 which is pivotally mounted on extension arm 68 of the transfer lever 70, and the lower end of member 117 has one end of a tension spring 118 secured thereto, the other end of said spring being secured as at 119 (Fig. 6) to collar 53a fixedly mounted on shaft 53. The purpose of this spring is to cause the upper end of lever 117 to be pressed to the right or in a clockwise manner in Figure 6 at all times when a transfer is being made, thereby preventing the lever 117 from becoming locked when the transfer arm 65 has moved downwardly since the bolt 113 also moves downwardly and rotates the bell crank 115 in a counter-clockwise manner in Figure 2.

Each time the transfer mechanism is operated and the transfer arm 65 is actuated to throw a filling carrier 60 from the rotary hopper 14, the lever 117 will be moved downwardly and the bell crank 115 will be rotated in a counter-clockwise manner in Figure 2, thereby causing member 105 to move against the tip of the bobbin and press the butt of the bobbin between members 23 in the rotary hopper 14. The spring 111a is fixedly secured to pin 111 and member 112 and the purpose of this spring is to prevent a jam from taking place if a filling carrier should not be properly located at the time the transfer mechanism is operated. By having the spring 111a, if the tip of the filling carrier should not be properly engaged by the member 105 or if the butt of the filling carrier should not be directed to the proper position between the members 23 the only thing that would result would be the spring 111a would be elongated and no damage would result to the filling carrier or to the machine.

After the filling carriers are placed in the filling carrier supports 16 they are rotated step by step until the filling carriers are disposed opposite the gears 120 and 121 which are fixedly mounted on shafts 122 and 123, (Figs. 7 and 10). These shafts are rotatably mounted in hopper stand 11 and have fixedly secured on the other end thereof pinions 125 and 126 respectively. These pinions 125 and 126 normally mesh with a larger gear 127 (Fig. 4), which is fixedly secured on the end of shaft 128, said shaft 128 being also rotatably mounted in hopper stand 11.

Figure 3:
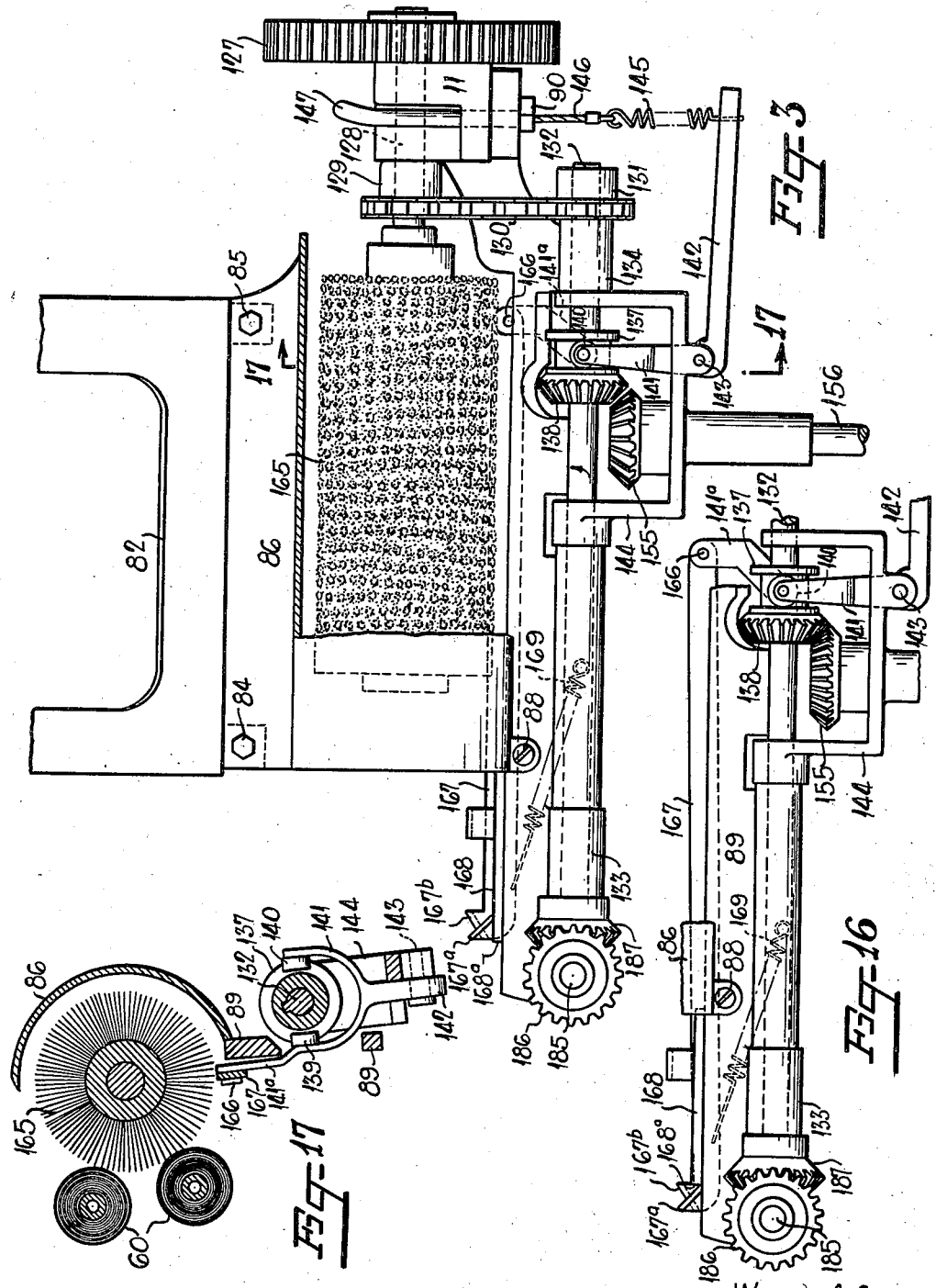
Figure 3 is an elevation looking at the right-hand side of Figure 1 with portions thereof broken away.

The shaft 128 has fixedly mounted thereon a sprocket 129, (Figs. 3 and 4), upon which is mounted a chain 130, said chain 130 being also mounted upon another sprocket 131 fixedly secured on shaft 132. This shaft 132 is rotatably mounted in bearings 133 and 134 which are integral with elongated bracket 89, (Fig. 3). Slidably keyed on shaft 132 is a grooved pulley 137 having integral therewith beveled gear 138. The grooved pulley 137 has rollers 139 and 140 mounted therein, said rollers being rotatably mounted on Y-shaped portion 141 on the upper end of bell crank lever 142. The lever 142 is pivoted as at 143 to U-shaped bracket 144 which is suspended from the shaft 132. The end of lever 142 (Fig. 3) has one end of tension spring 145 secured thereto, the upper end of said tension spring being secured to one end of a cable 146 which extends upwardly through pipe 147 and has its other end secured as at 148 to a pin 149, (Figs. 2, 3 and 5). This pin is secured to bolt 46 by any suitable means such as set screw 150.

When the dog 62 is actuated so that the bunter 61 will strike the same upon its movement to the left in Figure 1 to cause the lever 52 to rotate and also to cause the dog 45a' to ratchet over ratchet wheel 15, it is evident that the cable 146 will be pulled to the right in Figure 4, as the shaft 48 is rotated. When this is done the spring 145 will be moved upwardly in Figure 3, thus causing the lever 142 to rotate in a counter-clockwise manner in Figure 3 about point 143, which, in turn, will cause the beveled gear 138 to move to the left in Figure 3. This beveled gear is keyed on shaft 132 but has longitudinal sliding movement on this shaft. When it is moved to the left the gear 138 will be caused to mesh with bevel gear 155, said gear being fixed on the upper end of a shaft 156, the upper end of which is rotatably mounted in the U-shaped bracket 144, (Figs. 3 and 7). The lower end of shaft 156 is rotatably mounted in an inverted U-shaped bracket 157, (Figs. 1 and 12), and has fixedly secured on the lower end thereof a beveled gear 158 which gear meshes with a larger beveled gear 159 fixedly mounted on pick shaft 160. Shaft 160 is mounted in a bearing 161 secured to loom frame 10. The bevel gear 158, shaft 156, and beveled gear 155 rotate constantly, but shaft 132 only rotates when the shaft 48 (Figs. 4 and 10), is rotated in a manner to cause the lever 142 to be rotated to cause the gears 138 and 155 to mesh.

During the engagement of the gears 138 and 155 the sprocket 134 (Fig. 3), will be turned thereby turning the sprocket 129 which will rotate the gear 127 in a clockwise manner in Figure 4. This rotation will cause the pinions 125 and 126 to rotate in a counter-clockwise manner thus turning the shafts 122 and 123, which, in turn, will rotate the gears 120 and 121 in a counter-clockwise manner in Figure 10.

During the time that the gears 155 and 138 are in mesh the pinions 120 and 121 as shown in Figure 10, will cause the filling carrier supports 16 to rotate in a clockwise manner thereby rotating the filling carriers 60 to cause the same to be unwound. At the same time the brush 165 which is fixedly mounted in shaft 128 will be caused to rotate in a clockwise manner in Figure 10. It is thus seen that the brush will also tend to gather the loose ends on the filling carriers 60 in such a manner so that the ends may be engaged by a mechanical device which will be presently described.

By referring to Figures 3, 7 and 16, it is seen that the member 141 has an arm 141a projecting upwardly a substantial distance above roller 139, and to the upper end of arm 141a is pivotally secured as at 166, a link 167, said link 167 projecting to the right in Figure 7 and having a hook 167a on the end thereof which normally rests on top of a slide 168 secured to the upper portion of elongated bracket 89.

When the beveled gear 138 is moved to the left in Figure 3 or to the position shown in Figure 16 where it meshes with beveled gear 155 the lever 167 is likewise moved to the left and the hook portion 167a is caused to fall behind shoulder 168a of slide 168 and is held in this position by any suitable means such as a tension spring 169. The end of lever 167 also has a cam surface 167b which is contacted by a cam 175 secured on a chain 176, (Fig. 7). This chain is rotatably mounted on sprockets 177 and 178 and it is seen that when cam 175 contacts the lower side of cam surface 167b that the lever 167 will be raised upwardly thereby causing the hook portion 167a to rise upwardly to allow the spring 169 to pull the lever 167 to the right in Figures 3 and 16. When this is done the gear 138 will become disengaged from gear 155 thereby causing the brush 165 and the pinions 120 and 121 to cease rotation.

When a transfer to the shuttle takes place, lever 47, Figure 4, turns to the right, pulling cable 146 attached to spring 145 and spring to lever 142, said lever 142, Figures 3 and 7, moves upwardly, throwing yoke 145 to the left, to engage gear 138, lever 167 through its connection to yoke 141 at 167 moves to the left in Figure 3, and hook surfaces 167a engage end 168a of plate 168 thus holding gear 138 in mesh with gear 155. The spring 145 is about four times as strong as spring 169, which is just strong enough to snap yoke 141 to original position when the weft-end finding mechanism has completed its cycle which is governed by cam surface 175 on chain 176 which engages cam surface 167b on lever 167. Spring 145 and cable are slackened by reason of their return to original position on next back movement of the lay after transfer, therefore, spring 145 has to be strong enough to overcome the combined resistance of meshing gears 138 to 155 and the spring 169, yet spring 169 need only be strong enough to return gear meshing mechanism to its original position after weft-end finding mechanism has completed its cycle of operation, spring 145 having already returned to original position.

Each time a transfer is made the same rotation takes place as has just been described, but a different pair of bobbin supports are rotated. A sprocket 177 is rotatably secured to a bracket 174 which bracket has a slot 177a therein penetrated by stud bolts 173. This makes it possible to secure the proper adjustment or tension on sprocket chain 176. The sprocket 178 is fixedly secured on a spindle 185 which spindle has fixedly secured on one end thereof a beveled gear 186. Beveled gear 186 meshes with a beveled gear 187 which is fixedly secured on the end of shaft 132. While the gears 138 and 155 are in mesh the shaft 132 will be rotated which will also rotate the gears 187, 186 and the sprockets 177 and 178 which in turn will rotate the chain 176. Chain 176 has a plurality of hooks 176a secured thereto which are adapted to pass between the brush and the filling carrier 60 and engage the loose end of the yarn. When hook 176a has engaged the loose end it will conduct it outwardly and wind the same around the spindle 185.

*Method of operation*

Briefly, the operation of the invention is as follows:

The filling carriers 60 are placed in the stationary hopper 82 from whence they are conducted, step by step, by means of fluted wheel 91 until the carriers are disposed in the position shown in Figure 8. When the transfer mechanism is operated, the member 105 drives the butt end of the carrier between the members 23 of a holder filling carrier support 16, after which the carrier is moved, step by step, in the rotary hopper 14 until it reaches the brush 165. When the filling carrier support 16 reaches the brush, the gear 24 on the filling carrier support, Figure 18, engages one of the gears 120 or 121 as seen in Figure 10 where the gear is given rotary movement thereby rotating the filling carrier in the opposite direction from which it is wound to cause the same to be unwound, as at the same time the rotary brush 165 is rotated to gather up the loose end so that one of the hooks 176a which is mounted on chain 176 can gather the loose end and conduct it around the spindle 185 as seen in Figure 7. With the loose end wrapped around spindle 185 the filling carrier is then transferred, step by step, to the lowermost position in the rotary hopper from whence it is transferred to the shuttle in the lay of the loom 57.

In the event of the transfer mechanism operating twice in quick succession there would be two filling carriers with their thread ends not removed from the carriers. It is evident that the brush 165 would remove both thread ends from the carriers and they would be engaged by the hooks 176a on chain 176 and their ends carried to the spindle 185 to be wound thereon. This is a feature which is valuable, as it is seen that since the filling carriers are exposed to the rotary brush while in two positions, and therefore, if the brush should fail to find the end on a filling carrier while it is in its first position, it would have another chance at finding the end when the filling carrier is moved to another position upon a transfer operation.

If the thread end is removed from the filling carrier while in its upper position, it is seen that the chain 176 will move it outwardly towards the spindle 185, and the end will be drawn from the end of the carrier and out of contact with the rotary brush, as a straight line from the end of the filling carriers to the spindle does not cross the path of any of the portions of the brush as it rotates.

It is thus seen that a large supply of filling carriers can be placed in the stationary hopper 82 from whence they will be automatically fed to the rotary hopper which will gather the loose ends and wrap them around the spindle 185. The operation is entirely automatic and greatly increases the efficiency and output of a loom.

Figures 19 to 22 inclusive show a modified form of means for gathering the loose ends from the packages of yarn. In this form a suitable pipe 190 is connected to a source of compressed air which pipe is supported by a bracket 191 rising from member 89. This pipe leads to one side of a valve 192 which comprises a valve cap 193 which is integral with a pin 194, said valve cap being held in closed position as shown in Figure 22 by any suitable means such as compression spring 195. Lever 167 has a prong 196 projecting upwardly therefrom which is adapted to contact the pin 194 and open the valve at specified intervals to allow the air to pass therethrough. It is evident that when the lever 167 is moved to the right as in Figure 19, or to the left in Figures 3 and 16 to cause the gears 138 and 155 to mesh that the valve 193 will be opened. Connected to the other side of valve 192 is pipe 197 having a plurality of holes 198 therein through which a blast of air is emitted onto the surface of the filling carrier 60.

As has been previously stated, when the filling carriers reach the position shown in Figures 19 and 20 a suitable mechanism is employed to cause the filling carriers to be unwound and in this form of the invention the valve 192 is opened which will cause a blast of air to be simultaneously directed upon the filling carrier at the time it is unwound to cause the loose ends to be blown directly against screen 199 which is fixed on the side of bracket 89. With the loose end against the screen 199 the prongs 176 will engage the loose end and wind it around spindle 185. By using pneumatic means the brush 165 may or may not be dispensed with.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Means for supplying filled bobbins to the shuttle of a loom upon exhaustion of the filling on a bobbin carried by the shuttle comprising a rotary hopper, a fixed hopper disposed above the rotary hopper for holding a plurality of filled bobbins, means for removing the bobbins from the fixed hopper and placing the same in the rotary hopper, means for imparting intermittent rotation to the rotary hopper, means for imparting rotation to the bobbins held in the rotary hopper, a rotary brush for removing the end of the yarn on each bobbin, an endless chain having hooks thereon for conveying the loose end to a point removed from the tip of the bobbin, and means operable by the lay of the loom upon each transfer operation for moving the rotary hopper.

2. In a battery loom, a rotary hopper, means for placing filling carriers in the rotary hopper, means for imparting individual rotation to the filling carriers while held in the rotary hopper, a rotary brush for engaging the filling carriers while the same are rotated to remove the ends of yarn therefrom, means for engaging the removed ends and conveying the same to a point removed from the filling carriers, and means for holding said ends until the filling carriers are transferred from the rotary hopper.

3. In a battery loom, a rotary hopper, means for holding filling carriers in the hopper, means for imparting individual rotation to the means for holding the filling carriers while held in the rotary hopper, pneumatic means for removing the ends of yarn from the filling carriers while the same are rotated, means for conveying the removed ends to a point removed from the filling carriers, and means for holding the said ends until the filling carriers are transferred from the rotary hopper.

4. Means for supplying bobbins to the shuttle of a loom as the filling thereon becomes exhausted comprising a rotary hopper, a fixed hopper disposed above the rotary hopper, means for selecting and removing bobbins one at a time from the fixed hopper, said rotary hopper having a plurality of spring pressed jaws for receiving the butt ends of the bobbins and forming the sole support for the bobbins, means for moving said bobbins endwise one at a time between a pair of said jaws, means for imparting rotation to the rotary hopper, means for imparting rotation to some of the spring pressed jaws in the rotary hopper, a rotary brush for contacting the bobbins held in the rotating jaws and removing the loose end from each bobbin, an endless chain having the hooks thereon for moving said loose ends and holding the same until the bobbins are transferred from the rotary hopper.

5. In a loom having a rotary hopper provided with means for holding filling carriers therein, means for rotating the means for holding the filling carriers when they have reached a predetermined point in the cycle of rotation of the hopper, a rotary brush for engaging said filling carriers which are being rotated for removing the ends from the filling carriers, a pair of shafts, an endless chain mounted on said shafts and having hooks thereon adapted to move longitudinally of the brush and the filling carriers to convey the removed ends past the end of the brush and to wind the ends around one of the shafts on which the endless chain is mounted.

6. In a loom having a rotary hopper, a plurality of sets of spring-pressed jaws for receiving the butts of filling carriers and forming the sole support for the filling carriers, means for feeding filling carriers to said rotary hopper, means for engaging the tips of the filling carriers one at a time and pressing the same endwise to force the butts thereof between a set of the spring-pressed jaws, means for imparting rotation to at least one of said filling carriers when it reaches a predetermined point during the rotation of the rotary hopper, a rotary brush for engaging said filling carrier while it is rotating and removing the end therefrom, and means for engaging the removed end and securing it to a fixed object.

7. In a loom having a rotary hopper provided with a plurality of filling carrier supports for engaging the butt end of a filling carrier and forming the sole support for the carrier, means for rotating some of said filling carrier supports when they reach a predetermined point in the rotation of the hopper, means for engaging a rotating filling carrier to remove the end from the filling carrier, means for engaging the removed end and conveying it past and over the tip of the filling carrier, and means for holding the removed ends.

8. In a loom having a rotary hopper provided with a plurality of filling carrier supports, each of said supports comprising a pair of spring-pressed jaws for receiving the butt end of the filling carriers and forming the sole support therefor, each of said filling carrier supports having a pinion thereon, means for engaging said pinion when the filling carrier reaches a predetermined point in the rotation of the hopper, means for engaging the tip of a filling carrier and moving its butt end between a pair of said spring-pressed jaws, means for engaging said filling carriers while they are being rotated to remove the ends therefrom, and means for conveying the removed ends and securing them in position at a point beyond the tip of the filling carrier.

9. A loom having a rotary hopper provided with a plurality of filling carrier supports rotatably mounted in the hopper, means for imparting rotation to the supports when they reach a predetermined point during the rotation of the hopper, means for engaging the filling carriers in said rotating supports and removing the end therefrom, and means for engaging the removed end and conveying it past the tip of the filling carrier and means for holding the removed end in position until its carrier is transferred from the hopper.

10. A loom having a rotary hopper provided with a plurality of filling carrier supports rotatably mounted therein, means for rotating the filling carrier supports, means for engaging the filling carrier in the rotating supports and removing the end therefrom, a pair of parallel shafts, an endless chain mounted on said shafts and having hooks thereon for engaging the removed ends and winding the same around one of said shafts.

WILLIAM A. SMITH.